(12) United States Patent
Abe

(10) Patent No.: US 10,144,357 B2
(45) Date of Patent: Dec. 4, 2018

(54) SEAT COVER AND VEHICLE SEAT

(71) Applicant: TACHI-S CO., LTD., Tokyo (JP)

(72) Inventor: Hitoshi Abe, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 14/972,904

(22) Filed: Dec. 17, 2015

(65) Prior Publication Data

US 2016/0176350 A1  Jun. 23, 2016

(30) Foreign Application Priority Data

Dec. 18, 2014 (JP) ................................. 2014-256227

(51) Int. Cl.
*A47C 7/62* (2006.01)
*B60R 7/00* (2006.01)
(Continued)

(52) U.S. Cl.
CPC ................ *B60R 7/005* (2013.01); *B60N 2/58* (2013.01); *A47C 7/62* (2013.01); *B60N 2/44* (2013.01);
(Continued)

(58) Field of Classification Search
CPC ...... B60N 2/7011; B60N 2/44; B60N 2/7029; B60N 2/5816; B60N 2/64; B60N 2/58;
(Continued)

(56) References Cited

U.S. PATENT DOCUMENTS

| | | | | |
|---|---|---|---|---|
| 3,088,771 A | * | 5/1963 | Weigle ..................... | B60N 3/08 224/275 |
| 5,004,295 A | * | 4/1991 | Inoue ...................... | B60N 2/44 297/188.07 |

(Continued)

FOREIGN PATENT DOCUMENTS

| JP | 4-21775 Y2 | 5/1992 |
|---|---|---|
| JP | 6-49233 Y2 | 12/1994 |

(Continued)

OTHER PUBLICATIONS

Notification of Reasons for Refusal, dated May 15, 2018, for Japanese Application No. 2014-256227, 11 pages. (With English Translation).

*Primary Examiner* — Chi Q Nguyen
(74) *Attorney, Agent, or Firm* — Seed IP Law Group LLP

(57) ABSTRACT

A seat cover includes: a surface member; and a pocket including: a bag part arranged on a back surface side of the surface member and sewn on a folded portion of the surface member folded toward the back surface side along an edge of a pocket opening; a bead part interposed between the bag part and the folded portion extending along at least one of a pair of longitudinal edges of the pocket opening, sewn on the folded portion and the bag part, and arranged to protruding into the pocket opening; and a core member inserted into the bead part, wherein: the bead part and the core member respectively include extension portions extending beyond a pair of lateral edges of the pocket opening in a longitudinal (Continued)

direction of the pocket opening; and the extension portions of the bead part and the core member are fixed to each other.

5 Claims, 5 Drawing Sheets

(51) Int. Cl.
| | |
|---|---|
| *B60N 2/58* | (2006.01) |
| *B60N 2/64* | (2006.01) |
| *B60N 2/70* | (2006.01) |
| *B60R 7/04* | (2006.01) |
| *B60N 2/44* | (2006.01) |
| *B60R 11/00* | (2006.01) |

(52) U.S. Cl.
CPC .............. *B60N 2/5816* (2013.01); *B60N 2/64* (2013.01); *B60N 2/7011* (2013.01); *B60N 2/7029* (2013.01); *B60R 7/043* (2013.01); *B60R 11/00* (2013.01); *B60R 2011/0012* (2013.01); *B60R 2011/0015* (2013.01)

(58) Field of Classification Search
CPC . B60R 7/005; B60R 7/043; B60R 2011/0015; B60R 11/00; B60R 2011/0012; A47C 7/62
USPC ............ 297/188.01, 188.04, 188.06, 188.02, 297/188.2, 188.13, 188.19, 188.07
See application file for complete search history.

(56) References Cited

U.S. PATENT DOCUMENTS

| | | | |
|---|---|---|---|
| 5,692,608 A * | 12/1997 | Simien .................. | H01H 9/025 206/320 |
| 6,216,927 B1 * | 4/2001 | Meritt .................... | B60R 11/02 224/275 |
| 6,328,191 B1 | 12/2001 | Conley et al. | |
| 6,994,401 B1 * | 2/2006 | Fischer .................. | A47C 7/725 297/146 |
| 9,573,528 B1 * | 2/2017 | Line ....................... | B60R 7/005 |
| 2004/0075311 A1 * | 4/2004 | Linder .................... | A47C 7/74 297/188.04 |
| 2010/0102601 A1 * | 4/2010 | Yasuda ................... | B60N 2/58 297/188.04 |
| 2014/0042781 A1 * | 2/2014 | Reeves .................. | B60N 3/004 297/163 |
| 2015/0115673 A1 * | 4/2015 | von Saher .............. | A47C 31/11 297/188.06 |
| 2016/0176350 A1 * | 6/2016 | Abe ........................ | B60N 2/58 297/188.04 |

FOREIGN PATENT DOCUMENTS

| | | |
|---|---|---|
| JP | 7-122161 B2 | 12/1995 |
| JP | 2004-315995 A | 11/2004 |
| JP | 2011-254935 A | 12/2011 |
| JP | 2012-121421 A | 6/2012 |
| JP | 2013-112000 A | 6/2013 |

* cited by examiner

SEAT COVER AND VEHICLE SEAT

CROSS-REFERENCE TO RELATED APPLICATION(S)

This application is based upon and claims the benefit of priority from Japanese Patent Application No. 2014-256227, filed on Dec. 18, 2014, the entire contents of which are incorporated herein by reference.

BACKGROUND

1. Field of the Invention

The invention relates to a seat cover and a vehicle seat.

2. Description of the Related Art

JP-A -2013-112000 discloses a seat cover for a vehicle seat which includes a pocket tissue storing part. A slit-shaped pocket tissue insertion/take-out opening is formed in a surface member forming the seat cover, an inner surface piece overlapped with the pocket tissue insertion/take-out opening is provided on the back surface side of the surface member, and the inner surface piece is sewn on the surface member, thereby constituting the pocket tissue storing part.

And, in order to enhance the strength of the edge of the pocket tissue storing part, the terminal end of the surface member is folded toward the back surface side along the edge of the pocket tissue insertion/take-out opening, and the folded portion is sewn on such portion of the surface member as is overlapped with the folded portion.

Like the pocket tissue storing part of the seat cover disclosed in JP-A-2013-112000, when the surface member is folded toward the back surface side along a pocket opening, the pocket opening is enlarged and is always opened, thereby raising a fear of impairing the appearance quality of a vehicle seat.

SUMMARY

The invention is made in view of the above circumstances and thus has an object to enhance the appearance quality of a seat to be covered with a seat cover having a pocket.

An embodiment of the invention provides a seat cover including: a surface member; and a pocket including: a bag part arranged on a back surface side of the surface member and sewn on a folded portion of the surface member folded toward the back surface side along an edge of a pocket opening; a bead part interposed between the bag part and the folded portion of the surface member extending along at least one of a pair of longitudinal edges of the pocket opening, sewn on the folded portion and the bag part, and arranged to protruding into the pocket opening; and a core member inserted into the bead part, wherein: the bead part and the core member respectively include extension portions extending beyond a pair of lateral edges of the pocket opening in a longitudinal direction of the pocket opening; and the extension portion of the bead part and the extension portion of the core member are fixed to each other.

Also, an embodiment of the invention provides a vehicle seat covered with the above-mentioned seat cover.

According to the invention, the degree of opening of the pocket of a seat cover having a pocket can be reduced, thereby enabling the appearance quality of a seat covered with such seat cover.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
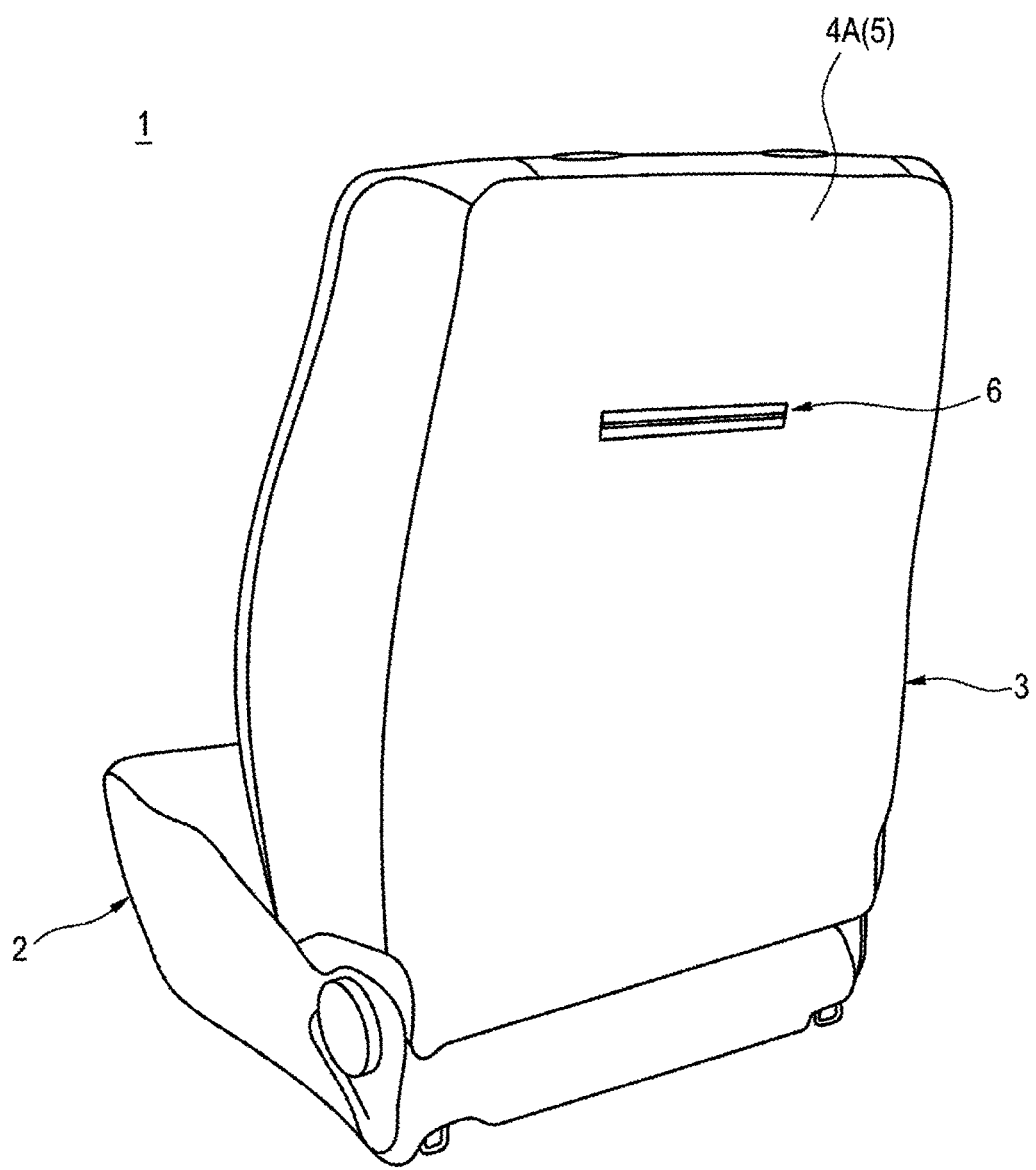
FIG. 1 is a structure view of an example of a vehicle seat, in order to explain an embodiment of the invention.

FIG. 1 shows a structure view of an example of a vehicle seat, in order to explain an embodiment of the invention.

A vehicle seat 1 shown in FIG. 1 includes a seat cushion 2 constituting a seat surface part and a seat back 3 constituting a back rest part. The seat cushion 2 and seat back 3 are structured such that a sat body, including a frame and a cushion pad to be supported by the frame, is covered by a seat cover 4A.

As a surface member 5 forming the seat cover 4A, there are used various materials, for example, a cloth, a natural leather, and a fake leather constituted of a base cloth coated and/or impregnated with synthetic resin such as vinyl chloride or polyurethane. The whole of the seat cover 4A may be formed of a single material, or multiple materials may be used and the respective portions of the seat cover 4A may be formed of such materials as correspond to their functions.

The seat cover 4A has a pocket 6. In the shown example, the pocket 6 is arranged in the back surface central portion of the seat back 3. Here, the pocket 6 may be arranged in the side surfaces of the seat back 3 and seat cushion 2, or may be arranged in the multiple locations of the seat cover 4A.

Figure 2:
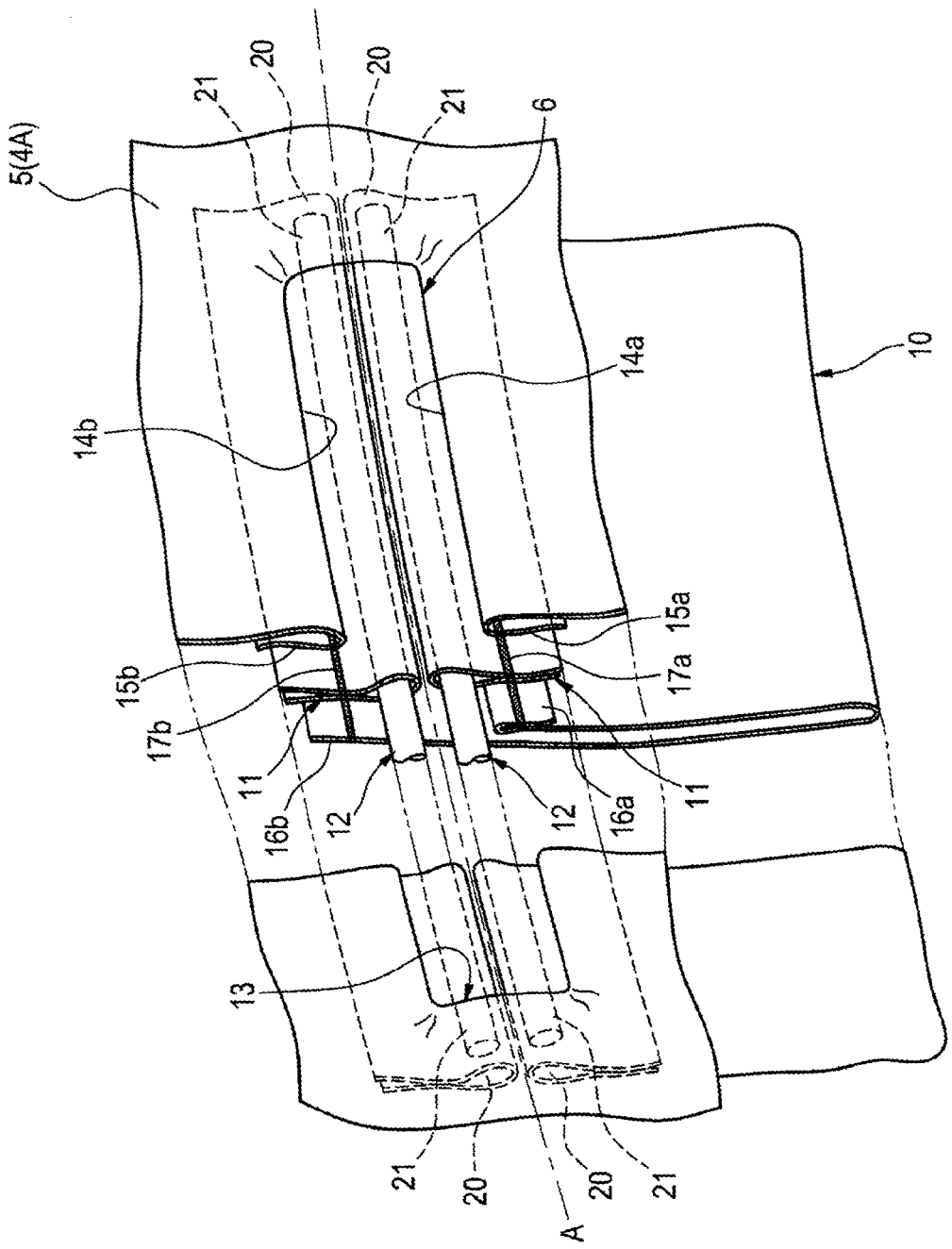
FIG. 2 is a partially broken structure view of a pocket formed in a seat cover shown FIG. 1.
Figure 3:
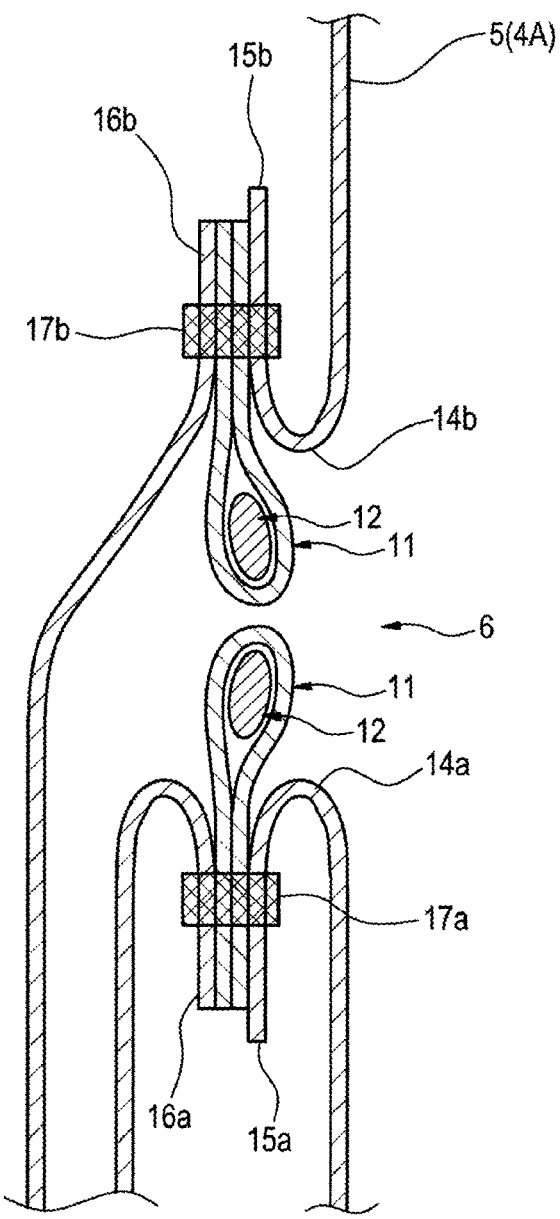
FIG. 3 is a typical section view of the structure of the pocket of FIG. 2.

FIGS. 2 and 3 show the structure of the pocket 6.

The pocket 6 includes a bag part 10, a bead part 11 and a core member 12. The surface member 5 forming the seat cover 4A has a pocket opening 13 formed by cutting a portion thereof into a slit-like shape and extending in the width direction of the back surface of the seat back 3, while the edge of the surface member 5 along the edge of the pocket opening 13 is folded toward the back surface side.

The bag part 10 can be formed of a proper material, for example, by connecting together the three sides of two substantially rectangular-shaped superimposed cloth pieces using a proper method such as by sewing, or by connecting together the two sides of a single substantially rectangular-shaped folded cloth piece using a proper method such as by sewing. The material for forming the bag part 10 may be identical with or different from that of the surface member 5 forming the seat cover 4A.

The bag part 10 is arranged on the back surface side (cushion pad side) of the surface member 5 forming the seat cover 4A and the opening edge of the bag part 10 is sewn on the folded portion of the surface member 5 folded toward the back surface side along the edge of the pocket opening 13.

The bead part 11 is arranged on at least one of a pair of longitudinal edges 14a and 14b of the pocket opening 13. In the shown example, the bead part 10 is arranged on both of the longitudinal edges 14a and 14b.

The bead part 11 arranged on the longitudinal edge 14a is formed of a single folded substantially rectangular-shaped folded proper material piece. With the folded side of the material piece protruding toward the pocket opening 13, the material piece is inserted between the folded portion 15a of the surface member 5 along the longitudinal edge 14a and the opening edge portion 16a of the bag part 10 to be sewn on the folded portion 15a, and is sewn on the folded portion 15a and opening edge portion 16a. The folded portion 15a, opening edge portion 16a and material piece inserted between them are integrally connected together by a sewing portion 17a.

The bead part 11 arranged on the longitudinal edge 14b side is also formed of a single folded substantially rectangular-shaped folded material piece. With the folded side of the cloth piece protruding toward the pocket opening 13, the material piece is inserted between the folded portion 15b of the surface member 5 along the longitudinal edge 14b and the opening edge portion 16a of the bag part 10 to be sewn on the folded portion 15b and is sewn on the folded portion 15b and opening edge portion 16b. The folded portion 15a, opening edge portion 16a and material piece inserted between them are integrally connected together by a sewing portion 17b.

The thus structured bead part 11 is formed in a cylindrical shape and is arranged to protrude toward the pocket opening 13. In the shown example where the bead parts 11 are respectively arranged on both sides of the longitudinal edges 14a and 14b of the pocket opening 13, the bead parts 11 on the longitudinal edges 14a and 14b are butted against each other along a center line A bisecting the pocket opening 13 in the lateral direction of the pocket opening 13.

The pocket opening 13 is enlarged by the surface member 5 being folded toward the back surface side along the edge of the pocket opening 13, whereas the pocket opening 13 is closed or the opening degree thereof is reduced by the bead part 11 formed to protrude toward the pocket opening 13.

Here, the folded portion 15a of the surface member 5 is not connected to such portion of the surface member 5 as is superimposed on the folded part 15 but, due to the rigidity of the material forming the surface member 5, there is applied to the surface member 5 a restoring force to turn up the folded portion 15a. The folded portion 15b is nor connected to such portion of the surface member 5 as is superimposed on the folded part 15 and thus, similarly, a restoring force to turn up the folded portion 15b is applied to the surface member 5.

When the folded portions 15a and 15b are turned up due to the above restoring forces of the surface member 5, the mouth of the pocket opening 13 to be closed by the bead parts 11 are caused to open. Thus, in order to prevent the mouth of the pocket opening 13 from being opened due to the turning-up of the folded portions 15a and 15b, in this seat cover 4A, the core members 12 are inserted into the respective cylindrical-shaped bead parts 11.

The core member 12 may only have rigidity capable of shape retention against the above restoring forces of the surface member 5 and thus it is formed of resin material such as vinyl chloride or paper material in a string-like or narrow strip-like shape. Preferably, the core member 12 may be elastically deformable.

And, the bead part 11 includes, on both ends, extension portions 20 extending in the longitudinal direction of the pocket opening 13 beyond a pair of lateral edges of the pocket opening 13, while the core member 12 inserted into the bead part 11 also includes, on both ends, extension portions 21 extending in the longitudinal direction of the pocket opening 13 beyond the paired lateral edges of the pocket opening 13.

One extension portion 20 of the bead part 11 and the extension portion 21 of the core member 12 to be covered by this extension portion 20 are fixed to each other by a proper method such by sewing, while the other extension portion 20 of the bead part 11 and the extension portion 21 of the core member 12 to be covered by this extension portion 20 are also fixed to each other. Thus, the bead part 11 and core member 12 are united integrally, thereby preventing position displacement of the core member 12 within the bead part 11 and loosening of the bead part 11.

And the extension portions 21 of the core members 12 inserted into the bead parts 11 sewn on the folded portion 15a are engaged with the edge of the surface member 5 along the lateral edge of the pocket opening 13. The core members 12 engaged with the edge of the surface member 5 serves as a prop, thereby preventing the folded portions 15a from turning up.

Similarly, the extension portions 21 of the core members 12 inserted into the bead parts 11 sewn on the folded portion 15b are engaged with the edge of the surface member 5 along the lateral edge of the pocket opening 13. The core members 12 engaged with the edge of the surface member 5 serves as a prop, thereby preventing the folded portions 15a from turning up.

Prevention of turn-up of the folded portions 15a and 15b enables prevention of opening of the mouth of the pocket opening 13. This can enhance the appearance quality of the vehicle seat 1 covered with the seat cover 4A.

Durability is required of the surface member 5 forming the seat cover 4A of the vehicle seat 1, the material of the surface member 5 is generally higher in rigidity (restoring force) than a material used, for example, for clothes, and fake leather used as the material of the surface member 5 is high in rigidity because it is impregnated and/or coated with resin. Thus, prevention of opening of the mouth of the pocket opening 13 using the core members 12 is particularly useful.

Figure 4:
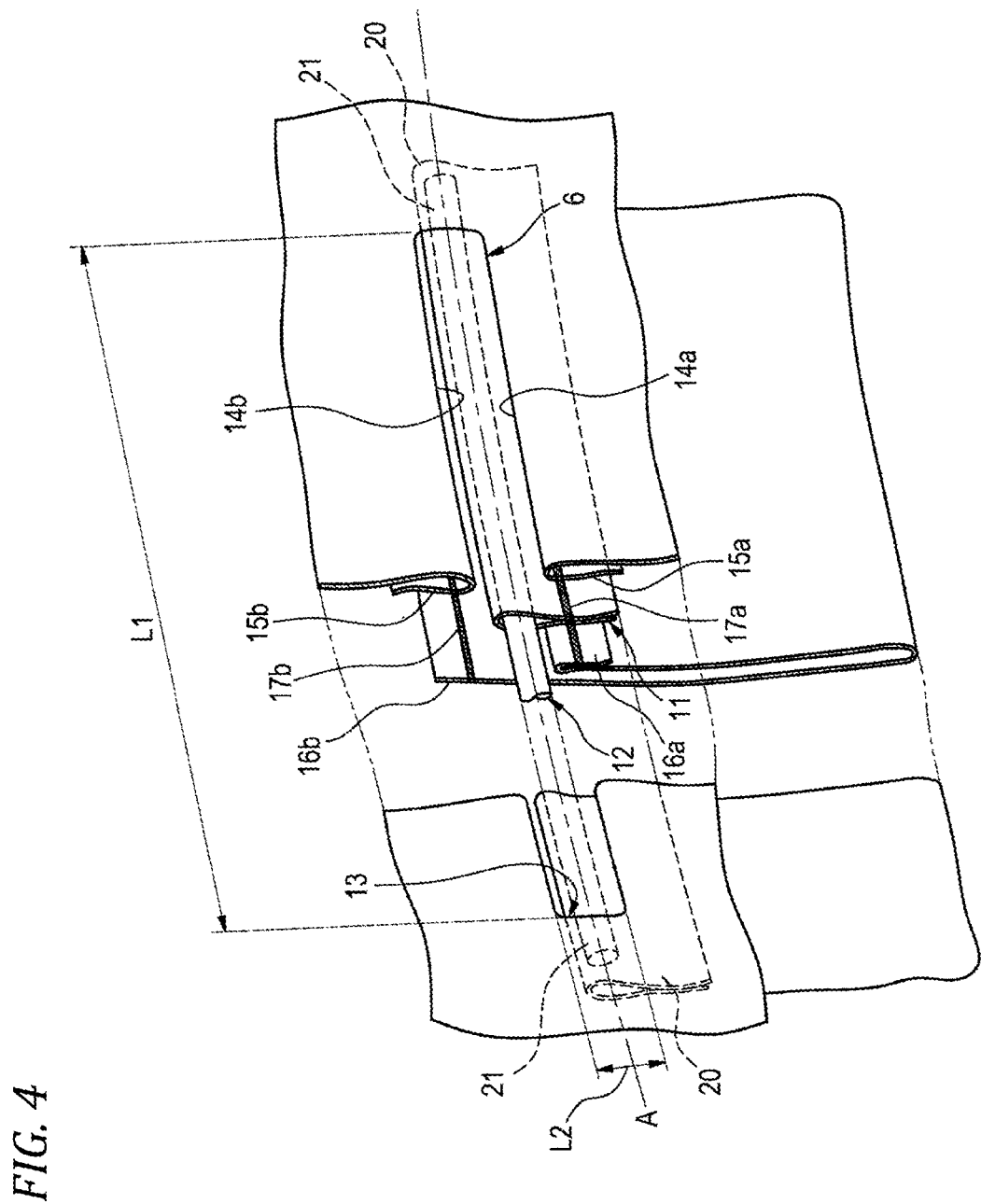
FIG. 4 is a structure view of another example of a pocket of the seat cover, in order to explain the embodiment of the invention.
Figure 5:
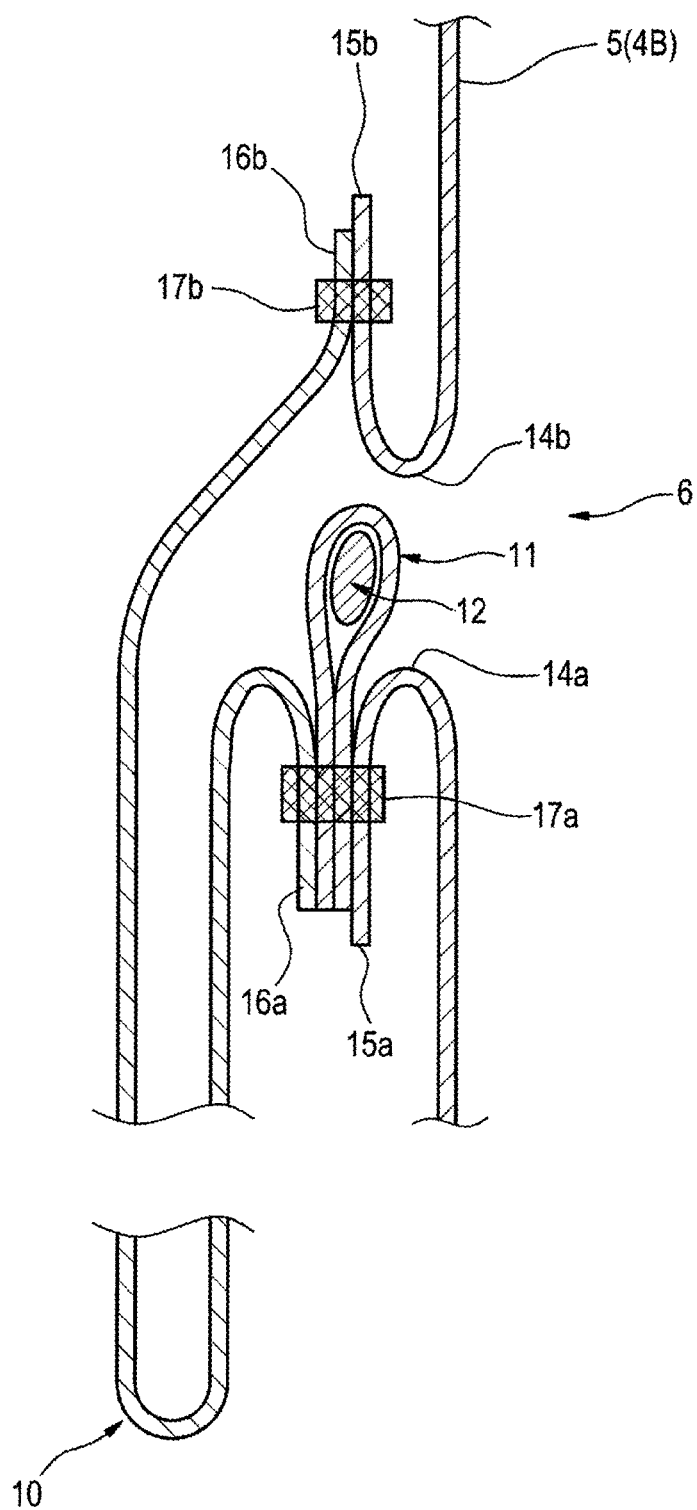
FIG. 5; is a typical section view of the structure of the pocket of FIG. 4.

FIGS. 4 and 5 show the structure of another example of the pocket of the seat cover, in order to explain the embodiment of the invention. Here, composing elements used in common with the above-described seat cover 4A are given common designations and the description thereof is omitted or simplified.

In a pocket 6 of a seat cover 4B shown in FIGS. 4 and 5, the bead part 11 is provided on only one (14a) of a pair of longitudinal edges 14a and 14b of the a pocket opening 13. The bead part 11 protrudes into the pocket opening 13 toward the longitudinal edge 14b beyond a center line A bisecting the pocket opening 13 in the lateral direction of the pocket opening 13.

A core member 12 is inserted into the bead part 11 and, in the two ends of the bead part 11, there are formed extension portions 20 respectively extending beyond a pair of lateral edges of the pocket opening 13 in the longitudinal direction of the pocket opening 13. In the two ends of the core member 12 as well, there are formed extension portions 21 respectively extending beyond a pair of lateral edges of the pocket opening 13 in the longitudinal direction of the pocket opening 13. And, the extension portions 20 of the bead part 11 and the extension portions 21 of the core member 12 are fixed to each other, whereby the bead part 11 and core member 12 are united integrally.

The extension portions 21 of the core member 12 inserted into the bead part 11 sewn on the folded portion 15a are respectively engaged with the edge of the surface member 5 extending along the lateral edge of the pocket opening 13. Thus, the core member 12 engaged with the edge of the surface member 5 serves as a prop, thereby preventing the folded portion 15a from being turned up due to the restoring force of the surface member 5.

The core member 12 arranged on the longitudinal edge 14b side beyond the center line A is overlapped with the opening edge 16b of the bag part 10 sewn on the folded portion 15b extending along the longitudinal edge 14b. Thus, the core member 12 serves as a prop, thereby preventing the folded portion 15b from being turned up due to the restoring force of the surface member 5.

In the pocket 6 of the seat cover 4B, the bead part 11 is provided only one longitudinal edge 11a of the pocket opening 13, and the bead 11 is arranged to protrude into the pocket opening 13 while extending on the other longitudinal edge 14b side beyond the center line A. This structure is especially useful for the pocket 6 of a relatively small size and can enlarge the internal space of the bead 11, into which the core member 12 is inserted, and thus enables use of a thick core member 12 having rigidity capable of resisting the restoring force of the surface member 5, thereby enabling more positive prevention of opening of the mouth of the pocket opening 13.

Products to be stored in the relatively small size pocket 6 are not limited to specific ones but include relatively small-sized products, for example, portable electronics such as a portable phone, a smart phone, a tablet computer and a portable game machine, a book, and a pocket tissue. The pocket 6 for storing this kind of relatively small-sized products may preferably be structured such that the length L1 of the longitudinal edges 14a and 14b of the pocket opening 13 is 18 mm to 220 mm or less and the length L2 of the lateral edge is 8 mm to 20 mm or less.

Here, the above-mentioned structures of the seat cover 4A, seat cover 4B and vehicle seat 1 are examples and various proper deformations and changes are possible without departing from the subject matter of the invention.

As described above, the seat cover disclosed in this specification is a seat cover having a pocket. The pocket includes: a bag part disposed on the back surface side of a surface member forming the seat cover and sewn on the folded portion of the surface member folded toward the back surface side along the edge of the pocket opening; a cylindrical-shaped bead part inserted between the bag part and the folded portion of the surface member extending along at least one of the paired longitudinal edges of the pocket opening; and, a core member inserted into the bead part. And, the bead part and core member respectively include extension portions extending in the longitudinal direction of the pocket opening beyond the paired lateral edges of the pocket opening, while the extension portion of the bead part and the extension portion of the core member are fixed to each other.

Also, in the seat cover disclosed in this specification, the bead part is provided only one of the paired longitudinal edges of the pocket opening and protrudes toward the other longitudinal edge of the pocket opening beyond the center line bisecting the pocket opening in the lateral direction of the pocket opening.

Also, in the seat cover disclosed in this specification, the length of the longitudinal edge of the pocket opening is 18 mm to 220 mm or less and the length of the lateral edge is 8 mm to 20 mm or less.

In the seat cover disclosed in this specification, the surface member is a fake leather.

Also, the vehicle seat disclosed in this specification is covered with the seat cover.

What is claimed is:

1. A seat cover comprising:
   a surface member; and
   a pocket including:
      a bag part arranged on a back surface side of the surface member and sewn on a folded portion of the surface member folded toward the back surface side along an edge of a pocket opening;
      a bead part interposed between the bag part and the folded portion of the surface member extending along at least one of a pair of longitudinal edges of the pocket opening, sewn on the folded portion and the bag part, and arranged to protruding into the pocket opening; and
      a core member inserted into the bead part, wherein:
   the bead part and the core member respectively include extension portions extending beyond a pair of lateral edges of the pocket opening in a longitudinal direction of the pocket opening; and
   the extension portion of the bead part and the extension portion of the core member are fixed to each other.

2. The seat cover according to claim 1, wherein
   the bead part is arranged on one of the pair of longitudinal edges of the pocket opening and protrudes toward the other longitudinal edge beyond a center line bisecting the pocket opening in a lateral direction.

3. The seat cover according to claim 2, wherein
   a length of the longitudinal edge of the pocket opening is 18 mm to 220 mm or less and a length of the lateral edge is 8 mm to 20 mm or less.

4. The seat cover according to claim 1, wherein
   the surface member is a fake leather.

5. A vehicle seat comprising:
   a seat body; and
   a seat cover comprising:
      a surface member; and
      a pocket including: a bag part arranged on a back surface side of the surface member and sewn on a folded portion of the surface member folded toward the back surface side along an edge of a pocket opening; a bead part interposed between the bag part and the folded portion of the surface member extending along at least one of a pair of longitudinal edges of the pocket opening, sewn on the folded portion and the bag part, and arranged to protruding into the pocket opening; and a core member inserted into the bead part, wherein:
   the bead part and the core member respectively include extension portions extending beyond a pair of lateral edges of the pocket opening in a longitudinal direction of the pocket opening;
   the extension portion of the bead part and the extension portion of the core member are fixed to each other; and
   the seat body is covered with the seat cover.

* * * * *